United States Patent
Onda

[11] Patent Number: 5,956,534
[45] Date of Patent: Sep. 21, 1999

[54] RANGE FINDER FOR CAMERA

[75] Inventor: Kazuhiko Onda, Saitama, Japan

[73] Assignee: Fuji Photo Optical Co., Ltd., Saitama, Japan

[21] Appl. No.: 08/990,998

[22] Filed: Dec. 15, 1997

[30] Foreign Application Priority Data

Dec. 16, 1996 [JP] Japan .................................. 8-335944

[51] Int. Cl.$^6$ ................................................. G03B 13/36
[52] U.S. Cl. ............................................................ 396/106
[58] Field of Search ........................... 396/106; 356/3.01, 356/3.02, 3.03, 3.04, 3.05, 3.06, 3.07, 3.08

[56] References Cited

U.S. PATENT DOCUMENTS

| | | |
|---|---|---|
| 4,828,383 | 5/1989 | Kunishige et al. ..................... 356/3.02 |
| 5,099,112 | 3/1992 | Kamitani et al. ....................... 396/106 |
| 5,488,468 | 1/1996 | Kawanishi et al. .................... 356/3.02 |

FOREIGN PATENT DOCUMENTS

| | | |
|---|---|---|
| 1287412 | 11/1989 | Japan . |
| 212010 | 1/1990 | Japan . |

*Primary Examiner*—W. B. Perkey
*Attorney, Agent, or Firm*—Leydig, Voit & Mayer, Ltd.

[57] ABSTRACT

A camera range finder provides a first shielding member, secured to a frame, for urging light-emitting means toward a projection lens and covering an outer periphery of the light-emitting means; and a second shielding member, secured to the frame, for urging light-emitting means toward a light-receiving lens and covering an outer periphery of the light-receiving means. The respective shielding members have both shielding and urging functions for the light-emitting and light-receiving means. In a simple configuration, the light-emitting means and light-receiving means can secure both positional adjustment and electro-magnetic shielding.

9 Claims, 2 Drawing Sheets

RANGE FINDER FOR CAMERA

BACKGROUND OF THE INVENTION

1. Field of the Invention

The present invention relates to a range finder for a camera, which determines a distance to an object, and in particular to a camera range finder whose light-receiving means or light-emitting means is provided with electromagnetic shielding.

2. Related Background Art

Known as a camera range finder is the one employing a trigonometric ranging system. The range finder employing the trigonometric ranging system comprises a light-emitting unit constituted by an infrared LED, a projection lens, and the like for projecting light onto an object; and a light-receiving unit constituted by a PSD (position sensing device), a condenser lens, and the like. In such a range finder, the light-emitting unit projects light onto the object, and the light-receiving unit receives the light reflected by the object, whereby the distance to the object is measured on the basis of the imaging position of the reflected light in the light-receiving means. Consequently, in order to enhance the measuring accuracy in the range finder, it is important for the light-emitting means such as infrared LED and the light-receiving unit such as PSD to be disposed at accurate positions as designed. Therefore, in general, a mechanism is provided for adjusting the positions of light-emitting and light-receiving means.

Examples of such a camera range finder are specifically disclosed in Japanese Patent Application Laid-Open Nos. 1-287412 and 2-12010. In the range finder disclosed in Japanese Patent Application Laid-Open No. 1-287412, as shown in FIG. 1 thereof, a condenser lens is secured to the front portion of a bedplate, while a light-emitting element is attached to the rear portion of the bedplate so as to be horizontally movable and is urged forward and sideward respectively by two leaf springs, thus constituting a light-emitting unit. In the light-emitting unit in this range finder, two adjustment pins respectively placed horizontally and vertically can move the light-emitting element horizontally and vertically so as to minutely adjust the position of the light-emitting element with respect to the condenser lens.

In the range finder disclosed in Japanese Patent Application Laid-Open No. 2-12010, on the other hand, as shown in FIGS. 1 or 3 thereof, a light-receiving lens is movably attached to an AF unit frame, while a PSD case made of a metal is placed downstream the light-receiving lens. Accommodated within the PSD case is a PSD as a light-receiving element, whereby the PSD is shielded (electromagnetically shielded) by the PSD case.

The above-mentioned conventional camera range finders, however, yield the following disadvantages. Namely, in the former (disclosed in Japanese Patent Application Laid-Open No. 1-287412), since the light-emitting element is not shielded, light may not be projected stably onto the object. Also, in order to shield the light-emitting element, the light emitting element has to be shielded together with the leaf springs directly urging the light-emitting element, thus increasing the number of parts due to the shielding, and increasing the size of the mechanism for adjusting the position of the light-emitting element. In the latter (disclosed in Japanese Patent Application Laid-Open No. 2-12010), on the other hand, since the light-receiving lens whose position should be adjusted with respect to the PSD projects out of the AF unit frame, its adjusted position may shift in a subsequent step of making the range finder. Therefore, there is a strong demand for developing a technique for collectively overcoming the disadvantages in the former and latter range finders without using any complicated mechanism.

SUMMARY OF THE INVENTION

In order to overcome the foregoing problems, it is an object of the present invention to provide a camera range finder which can securely effect positional adjustment and electromagnetic shielding in light-receiving means and light-emitting means, while having a simple configuration.

The present invention provides a range finder, incorporated in a camera, for measuring a distance to an object, the range finder comprising:

a frame;

light-emitting means attached to the frame;

a projection lens, secured to the frame, for projecting light from the light-emitting means toward the object;

a light-receiving lens, secured to the frame, for receiving light from the object;

light-receiving means, attached to the frame, for receiving light from the light-receiving lens; and a shielding member, secured to the frame, for urging the light-emitting means toward the projection lens and covering an outer periphery of the light-emitting means.

Also, the present invention provides a range finder, incorporated in a camera, for measuring a distance to an object, the range finder comprising:

a frame;

light-emitting means attached to the frame;

a projection lens, secured to the frame, for projecting light from the light-emitting means toward the object;

a light-receiving lens, secured to the frame, for receiving light from the object;

light-receiving means, attached to the frame, for receiving light from the light-receiving lens; and a shielding member, secured to the frame, for urging the light-receiving means toward the light-receiving lens and covering an outer periphery of the light-receiving means.

Further, the present invention provides a range finder, incorporated in a camera, for measuring a distance to an object, the range finder comprising:

a frame;

light-emitting means attached to the frame;

a projection lens, secured to the frame, for projecting light from the light-emitting means toward the object;

a light-receiving lens, secured to the frame, for receiving light from the object;

light-receiving means, attached to the frame, for receiving light from the light-receiving lens;

a first shielding member, secured to the frame, for urging the light-emitting means toward the projection lens and covering an outer periphery of the light-emitting means; and a second shielding member, secured to the frame, for urging the light-receiving means toward the light-receiving lens and covering an outer periphery of the light-receiving means.

In the present invention, as the shielding member additionally functions to urge the light-receiving means, it is unnecessary to separately provide an urging member. Consequently, the light-receiving means can be shielded without increasing the number of constituent parts, whereby the camera can attain a smaller size. Also, as the light-receiving means is accommodated within the shielding member secured to the frame, the light-receiving means does not come into contact with external parts once its position is adjusted, thus being prevented from shifting during manufacturing steps.

Also, in the present invention, as the shielding member additionally functions to urge the light-emitting means, it is unnecessary to separately provide an urging member. Consequently, the light-emitting means can be shielded without increasing the number of constituent parts, whereby the camera can attain a smaller size. Also, as the light-emitting means is accommodated within the shielding member secured to the frame, the light-emitting means does not come into contact with external parts once its position is adjusted, thus being prevented from shifting during manufacturing steps.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DETAILED DESCRIPTION OF THE PREFERRED EMBODIMENTS

In the following, embodiments of the present invention will be explained with reference to the accompanying drawings. Between the drawings, constituents identical to each other will be referred to with numerals or letters identical to each other without their overlapping explanations being repeated.

Embodiment 1

Figure 1:
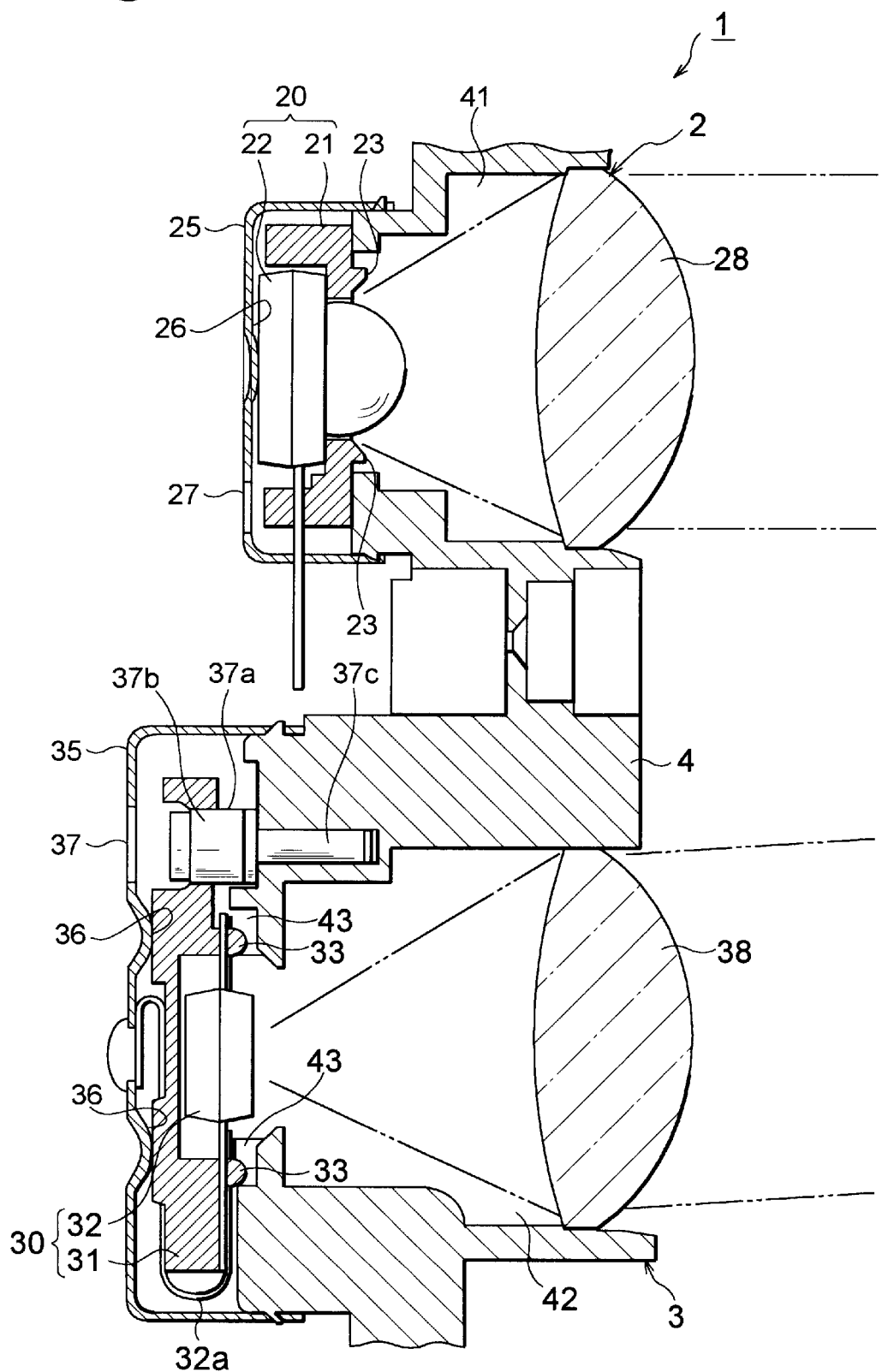
FIG. 1 is schematic sectional view showing a camera range finder in accordance with an embodiment of the present invention.

FIG. 1 is a schematic horizontal sectional view showing a camera range finder in accordance with Embodiment 1 of the present invention. In FIG. 1, a range finder 1 is constituted by a light-projecting unit 2 and a light-receiving unit 3. As shown in FIG. 1, the light-projecting unit 2 comprises a light-emitting means 20 disposed on the rear side (left side in FIG. 1) of a frame 4 and a projection lens 28 disposed on the front side thereof. The light-emitting means 20 emits light used for ranging, and has a configuration in which, for example, a light-emitting element 22 is attached to a movable frame 21. The light-emitting means 20 is placed at a rear opening portion of a through hole 41 formed in the frame 4. The movable frame 21, which is a frame member for making the light-emitting element 22 movable, is attached to the frame 4 and is movable along an axis substantially orthogonal to the light-projecting direction. For example, the movable frame 21 is provided with bosses 23 and 23 projecting toward the projection lens 28, which are inserted into the through hole 41 of the frame 4, thus restricting the range of movement of the movable frame 21 with respect to the frame 4. On the other hand, the light-emitting element 22 is an element which emits light upon input of an electric signal or the like, and an infrared LED or the like is used therefor, for example. The light-emitting element 22 is firmly attached to the movable frame 21, with its light-emitting face directed forward, and is disposed so as to be moved together with the movable frame 21.

Also provided, as shown in FIG. 1, is a shielding member 25 covering the light-emitting means 20 constituted by the light-emitting element 22 and the movable frame 21. The shielding member 25 is used for shielding the light-emitting means 20 from external electromagnetic noise and preventing the light-emitting means 20 from easily moving upon contact or the like. Employed as the shielding member 25 is a metal case or the like having a certain degree of rigidity and a shielding function. The shielding member 25 is secured to the frame 4 while urging the light-emitting means 20 in parallel to the light-projecting direction. Namely, a protrusion 26 is formed on the inner face side of the shielding member 25, whereby the shielding member 25 is secured to the frame 4 while the protrusion 26 abuts to the light-emitting means 20. Though urging is effected in the state where the protrusion 26 abuts to the light-emitting element 22 in FIG. 1, the protrusion 26 may abut to the movable frame 21 as long as the movable frame 21 and the light-emitting element 22 are united together by means of an adhesive or the like.

Figure 2:
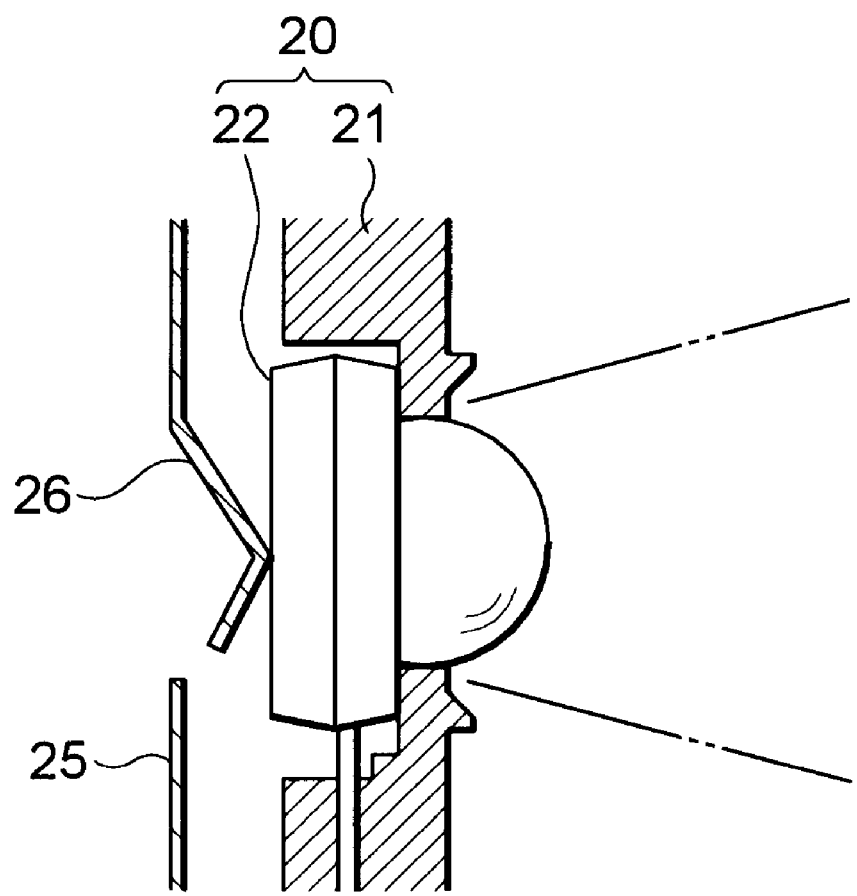
FIG. 2 is an explanatory view of a shielding member in a light-projecting unit.

Preferably, the protrusion 26 of the shielding member 25 is projected toward its attaching direction as shown in FIG. 1. In this case, the light-emitting means 20 is urged at the same time when the shielding member 25 is attached to the frame 4, whereby the light-emitting means 20 can securely be urged, while facilitating the assembly and manufacture. Preferably, as shown in FIG. 1, the protrusion 26 of the shielding member 25 urges the light-emitting means 20 in a direction orthogonal to the moving axis of the light-emitting means 20 (movable frame 21 in FIG. 1). In this case, though an impact imparted to the shielding member 25 is transmitted to the light-emitting means 20 through the protrusion 26, the direction of transmission is not in parallel with the moving axis, whereby the light-emitting means 20 does not move easily, thus effectively preventing the light-emitting means 20 from shifting its position after adjustment. Here, the protrusion 26 is not restricted to that formed by an inward-recessed wall portion of the shielding member 25 as shown in FIG. 1. As long as it can project inward so as to urge the light-emitting means 20, it may adopt any other configuration such as the one shown in FIG. 2 in which a part of the wall of the shielding member 25 is bent inward.

As shown in FIG. 1, the shielding member 25 has a hole 27 penetrating therethrough so as to communicate the inside and outside with each other. This hole 27 is used for adjusting the position of the light-emitting means 20 disposed within the shielding member 25. Thus, the position of the light-emitting means 20 within the shielding member 25 can appropriately be adjusted through the hole 27.

The structure for moving the light-emitting means 20 with respect to the frame 4 is not restricted to the one in which the movable frame 21 is provided with the bosses 23 for engaging with the frame 4. Any other structure may be employed as long as the light-emitting element 22 can be moved along an axis orthogonal to the light-projecting direction. Also, the movable frame 21 may be omitted in the light-emitting means 20, so as to allow the light-emitting element 22 to be directly attached to the frame 4.

As shown in FIG. 1, the projection lens 28 is disposed on the front side of the frame 4. The projection lens 28 is used for collecting the light emitted from the light-emitting element 22 and projecting thus collected light toward an object. Through the projection lens 28, the object is irradiated with the light.

On the other hand, the frame 4 is provided with the light-receiving unit 3 in parallel with the light-projecting unit 2. The light-receiving unit 3 comprises a light-receiving element 32 disposed on the rear side (left side in FIG. 1) of the frame 4 and a light-receiving lens 38 placed on the front side. The light-receiving means 30 is used for receiving the light projected from the light-projecting unit 2 and then reflected by the object or the like. For example, the light-receiving means 30 is constituted by the light-receiving element 32 attached to a movable frame 31, and is disposed at a rear opening portion of a through hole 42 formed in the frame 4. The movable frame 31 is a frame member for making the light-receiving element 32 movable, and is attached to the frame 4 so as to be movable along an axis substantially orthogonal to the light-entering direction. For example, the movable frame 31 is provided with bosses 33 and 33 projecting toward the light-receiving lens 38, which are inserted into a groove 43 recessed in the frame 43, thus allowing the movable frame 31 to move toward and away from the light-projecting unit 2 with respect to the frame 4.

The light-receiving element 32 is an element which receives light and outputs an electric signal according to the state of thus received light. As the light-receiving element 32, a PSD (position sensing device) or the like is employed, for example, and an electric signal corresponding to the distance to the object is outputted according to trigonometric ranging based on the light-receiving position of the light-receiving element. Then, based on this output signal, a non-depicted computing means computes the distance to the object. Also, the light-receiving element 32 is secured to the movable frame 31, with its light-receiving face directed forward, and is disposed so as to be movable together with the movable frame 31. The light-receiving element 32 is secured, for example, by positioning it by the bosses 33 and then holding it between the frame 4 and the movable frame 31 so as to be latched thereby. Further, as shown in FIG. 1, the light-receiving element 32 is mounted on an FPC (flexible printed circuit board) 32a, thus allowing the light-receiving element 32 to achieve electric connection. The FPC 32a has a flexibility, so that it can be placed within a narrow space as being freely flexed. In FIG. 1, for grounding, the FPC 32a is bent from the front side (right side in FIG. 1) of the movable frame 31, where the light-receiving element 32 is disposed, toward the rear side so as to enclose the movable frame 31 therein, and is further bent on the rear side so as to be soldered onto a shielding member 35 which will be explained hereinafter. In such a configuration, when the FPC 32a is provided with a bent portion having such a play that allows the light-receiving means 30 to move, the light-receiving means 30 can be moved freely without obstructing the electric connection of the light-receiving element 32.

As shown in FIG. 1, the shielding member 35 is disposed so as to cover the light-receiving means 30 constituted by the light-receiving element 32 and the movable frame 31. The shielding member 35 is used for shielding the light-receiving means 30 from external electromagnetic noise and preventing the light-receiving means 30 from easily moving upon contact or the like. Employed as the shielding member 35 is a metal case or the like having a certain degree of rigidity and a shielding function. The shielding member 35 is secured to the frame 4 while urging the light-receiving means 30 in parallel to the light-entering direction. Namely, a protrusion 36 is formed on the inner face side of the shielding member 35, whereby the shielding member 35 is secured to the frame 4 while the protrusion 36 abuts to the light-receiving means 30. Though urging is effected in the state where the protrusion 36 abuts to the movable frame 31 in FIG. 1, the protrusion 36 may abut to the light-receiving element 32 as well.

Preferably, the protrusion 36 of the shielding member 35 is projected toward its attaching direction as shown in FIG. 1. In this case, the light-receiving means 30 is urged at the same time when the shielding member 35 is attached to the frame 4, whereby the light-receiving means 30 can securely be urged, while facilitating the assembly and manufacture. Preferably, as shown in FIG. 1, the protrusion 36 is disposed at the position corresponding to each boss 33.

Preferably, as shown in FIG. 1, the protrusion 36 of the shielding member 35 urges the light-receiving means 30 in a direction orthogonal to the moving axis of the light-receiving means 30 (movable frame 31 in FIG. 1). In this case, though an impact imparted to the shielding member 35 is transmitted to the light-receiving means 30 through the protrusion 36, the direction of transmission is not in parallel with the moving axis, whereby the light-receiving means 30 does not move easily, thus effectively preventing the light-receiving means 30 from shifting its position after adjustment. Here, the protrusion 36 is not restricted to that formed by an inward-recessed wall portion of the shielding member 35 as shown in FIG. 1. As long as it can project inward so as to urge the light-receiving means 30, it may adopt any other configuration in which a part of the wall of the shielding member 35 is bent inward.

As shown in FIG. 1, an eccentric pin 37a is disposed so as to penetrate through the movable frame 31 and enter into the frame 4. Also, the shielding member 35 has a hole 37 penetrating therethrough so as to communicate the inside and outside with each other. Through the hole 37, the eccentric pin 37a can be rotated from the outside of the shielding member 35. The eccentric pin 37a is formed by a columnar head 37b having a larger diameter and a columnar base 37c having a smaller diameter which are connected together with an eccentricity (along different axes). In the state shown in FIG. 1, as the eccentric pin 37a rotates, the columnar head 37b moves eccentrically, thus allowing the movable frame 31, and consequently the light-receiving means 30, to move toward and away from the light-projecting unit 2. By using this movement, the position of the light-receiving means 30 can be adjusted appropriately.

The structure for moving the light-receiving means 30 with respect to the frame 4 should not be limited to the one using the eccentric pin 37a. Any other structure may be employed as long as the light-receiving element 32 can be moved along an axis substantially orthogonal to its light-entering direction (the optical axis of the incident light). Also, the movable frame 31 may be omitted in the light-receiving means 30, so as to allow the light-receiving element 32 to be directly attached to the frame 4.

As shown in FIG. 1, the light-receiving lens 38 is disposed on the front side of the frame 4. The light-receiving lens 38 is used for receiving the light reflected by the object and converging thus received light onto the light-receiving element 32. Thus, through the light-receiving lens 38, the light forms an image on the light-receiving element 32.

In the following, positional adjustments of the light-emitting means 20 and light-receiving means 30 in the camera range finder 1 will be explained.

First, with reference to FIG. 1, the positional adjustment of the light-emitting means 20 will be explained. Namely, the light-emitting means 20 comprising the light-emitting element 22 firmly attached to the movable frame 21 is movably attached to the frame 4, and then the shielding member 25 is attached to the frame 4 so as to cover the light-emitting means 20. Here, concurrently with the shielding member 25 being attached to the frame 4, the light-emitting means 20 is urged by the frame 4. Namely, when the shielding member 25 is being attached to the frame 4, the protrusion 26 of the shielding member 25 abuts to the light-emitting means 20; and when the shielding member 25 is completely secured to the frame 4, the protrusion 26 presses the light-emitting means 20 so as to urge it toward the front side of the frame 4. Consequently, within the shielding member 25, the light-emitting means 20 is held such that it does not move easily but can be moved when a certain degree of force is applied thereto. As the shielding member 25 is provided with an urging function, it becomes unnecessary to separately provide an urging means within the shielding member 25, thus allowing the number of parts to decrease in the range finder 1. Also, as the same member (shielding member 25) has both shielding and urging functions, the space for placing the members can be reduced, whereby the range finder 1 can be made smaller.

In this state (that of FIG. 1), the movable frame 21 is appropriately moved via the hole 27 so as to adjust the position of the light-emitting means 20 and, consequently, that of the light-emitting element 22. For example, a test chart is placed in front of the range finder 1 (right side of the range finder 1 in FIG. 1), and power is supplied to the light-emitting element 22 so as to make it emit light. In order for the light emitted from the light-emitting element 22 to be appropriately projected onto the test chart through the projection lens 28, an adjustment rod or the like is inserted into the hole 27 so as to move the movable frame 21 and position the light-emitting element 22. Then, the light-emitting means 20 is firmly attached to the frame 4 or the shielding member 25 by means of an adhesive or the like so as to immobilize the position of the light-emitting element 22, thus completing the positional adjustment of the light-emitting means 20.

After the position of the light-emitting means 20 is thus adjusted, in the step of incorporating the range finder 1 with the camera main body or the like, since the light-emitting means 20 is placed within the shielding member 25 and does not easily move even when an impact is imparted to the shielding member 25, the position of the light-emitting member 20 is prevented from shifting, thus allowing the range finder 1 to exhibit a stable performance.

In the following, with reference to FIG. 1, the positional adjustment of the light-receiving means 30 will be explained. Namely, the light-receiving means 30 comprising the light-receiving element 32 firmly attached to the movable frame 31 is movably attached to the frame 4, and then the shielding member 35 is attached to the frame 4 so as to cover the light-receiving means 30. Here, concurrently with the shielding member 35 being attached to the frame 4, the light-receiving means 30 is urged by the frame 4. Namely, when the shielding member 35 is being attached to the frame 4, the protrusion 36 of the shielding member 35 abuts to the light-receiving means 30; and when the shielding member 35 is completely secured to the frame 4, the protrusion 36 presses the light-receiving means 30 so as to urge it toward the front side of the frame 4. Consequently, within the shielding member 35, the light-receiving means 30 is held such that it does not move easily but can be moved when a certain degree of force is applied thereto. As the shielding member 35 is provided with an urging function, it becomes unnecessary to separately provide an urging means within the shielding member 35, thus allowing the number of parts to decrease in the range finder 1. Also, as the same member (shielding member 35) has both shielding and urging functions, the space for placing the members can be reduced, whereby the range finder 1 can be made smaller.

In this state (state of FIG. 1), the eccentric pin 37a is rotated so as to appropriately move the movable frame 31, thereby adjusting the position of the light-receiving means 30 and, consequently, that of the light-receiving element 32. For example, a test chart is placed in front of the range finder 1 (right side of the range finder 1 in FIG. 1), and while the light-emitting element 22 is caused to emit light, the test chart is moved toward and away from the range finder 1. The movable frame 31 is moved such that an appropriate signal is outputted from the light-receiving element 32 in response to the movement of the test chart, whereby the position of the light-receiving element 32 is determined. In order to move the movable frame 31, a driver or the like is inserted into the hole 37 so as to rotate the eccentric pin 37a. When moving the light-receiving means 30, since the FPC 32a has the bent portion with a play, it does not hinder the light-receiving means 30 from moving.

Then, the light-receiving means 30 is firmly attached to the frame 4 or the shielding member 35 by means of an adhesive or the like so as to immobilize the position of the light-receiving element 32, thus completing the positional adjustment of the light-receiving means 30.

After the position of the light-receiving means 30 is thus adjusted, in the step of incorporating the range finder 1 with the camera main body or the like, since the light-receiving means 30 is placed within the shielding member 35 and does not easily move even when an impact is imparted to the shielding member 35, the position of the light-receiving means 30 is prevented from shifting, thus allowing the range finder 1 to exhibit a stable performance.

As explained in the foregoing, in the camera range finder 1, since the shielding member 25 in the light-projecting unit 2 has both shielding and urging functions, no separate urging means is necessary, whereby the number of parts can be reduced. Also, since no space is necessary for attaching the urging means or the like, the range finder 1 can have a smaller size. Further, as the light-emitting means 20 is covered with the shielding member 25, it attains a structure strengthened against external forces, whereby maladjustment of the light-emitting means 20 or the like can be reduced. In the light-receiving unit 3, on the other hand, since the shielding member 35 has both shielding and urging functions, no separate urging means is necessary, whereby the number of parts can be reduced. Also, since no space is necessary for attaching the urging means or the like, the range finder 1 can have a smaller size. Further, as the light-receiving means 30 is covered with the shielding member 35, it attains a structure strengthened against external forces, whereby maladjustment of the light-receiving means 30 or the like can be reduced.

Embodiment 2

Though the light-projecting unit 2 and light-receiving unit 3 are respectively provided with shielding members 25 and 35 each having both shielding and urging functions in the above-mentioned range finder 1, only one of the units 2 and 3 may be provided with such a shielding member as well. Even in such a case, effects similar to those of the above-mentioned Embodiment 1 can be obtained in the unit provided with the shielding member.

As explained in the foregoing, the following effects can be obtained in accordance with the present invention.

In the light-projecting unit, as the shielding member covering the light-emitting means has both shielding and urging functions, it is unnecessary to provide a separate urging means, thus allowing the number of parts to reduce. Also, as no space is necessary for attaching the urging means or the like, a simple and small structure can be realized, thus allowing the camera to have a smaller size. Further, as the light-emitting means covered with the shielding member has a structure strengthened against external forces, maladjustment of the light-emitting means or the like can be reduced.

In the light-receiving unit, as the shielding member covering the light-receiving means has both shielding and urging functions, it is unnecessary to provide a separate urging means, thus allowing the number of parts to reduce. Also, as no space is necessary for attaching the urging means or the like, a simple and small structure can be realized, thus allowing the camera to have a smaller size. Further, as the light-receiving means covered with the shielding member has a structure strengthened against external forces, maladjustment of the light-receiving means or the like can be reduced.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A range finder, incorporated in a camera, for measuring a distance to an object, said range finder comprising:

a frame;

light-emitting means attached to said frame;

a projection lens, secured to said frame, for projecting light from said light-emitting means toward said object;

a light-receiving lens, secured to said frame, for receiving light from said object;

light-receiving means, attached to said frame, for receiving light from said light-receiving lens; and a shielding member, secured to said frame, for urging said light-emitting means toward said projection lens and covering an outer periphery of said light-emitting means.

2. The range finder according to claim 1, wherein said light-emitting means comprises a light-emitting element and a movable frame, to which said light-emitting element is attached, movable substantially perpendicularly to a direction along which said light-emitting element emits light, said shielding member having a protrusion for urging said light-emitting element toward said projection lens.

3. The range finder according to claim 1, wherein said shielding member is made of a metal.

4. A range finder, incorporated in a camera, for measuring a distance to an object, said range finder comprising:

a frame;

light-emitting means attached to said frame;

a projection lens, secured to said frame, for projecting light from said light-emitting means toward said object;

a light-receiving lens, secured to said frame, for receiving light from said object;

light-receiving means, attached to said frame, for receiving light from said light-receiving lens; and a shielding member, secured to said frame, for urging said light-receiving means toward said light-receiving lens and covering an outer periphery of said light-receiving means.

5. The range finder according to claim 4, wherein said light-receiving means comprises a light-receiving element and a movable frame, to which said light-receiving element is attached, movable substantially perpendicularly to a direction along which said light-receiving element receives light, said shielding member having a protrusion for urging said light-receiving element toward said light-receiving lens.

6. The range finder according to claim 4, wherein said shielding member is made of a metal.

7. A range finder, incorporated in a camera, for measuring a distance to an object, said range finder comprising:

a frame;

light-emitting means attached to said frame;

a projection lens, secured to said frame, for projecting light from said light-emitting means toward said object;

a light-receiving lens, secured to said frame, for receiving light from said object;

light-receiving means, attached to said frame, for receiving light from said light-receiving lens;

a first shielding member, secured to said frame, for urging said light-emitting means toward said projection lens and covering an outer periphery of said light-emitting means; and a second shielding member, secured to said frame, for urging said light-receiving means toward said light-receiving lens and covering an outer periphery of said light-receiving means.

8. The range finder according to claim 7, wherein said light-emitting means comprises a light-emitting element and a first movable frame, to which said light-emitting element is attached, movable substantially perpendicularly to a direction along which said light-emitting element emits light, said first shielding member having a first protrusion for urging said light-emitting element toward said projection lens; and wherein said light-receiving means comprises a light-receiving element and a second movable frame, to which said light-receiving element is attached, movable substantially perpendicularly to a direction along which said light-receiving element receives light, said second shielding member having a second protrusion for urging said light-receiving element toward said light-receiving lens.

9. The range finder according to claim 7, wherein each of said first and second shielding members is made of a metal.

* * * * *